Patented Nov. 3, 1953

2,658,062

UNITED STATES PATENT OFFICE 2,658,062

MINERAL OIL ADDITIVE

Robert H. Jones, Kenilworth, N. J., assignor to Standard Oil Development Company, a corporation of Delaware No Drawing. Application September 17, 1949, Serial No. 116,401

12 Claims. (Cl. 260—132)

This invention relates to mineral oil compositions and particularly to lubricants containing a detergent additive.

The art of metallic detergents for lubricating oil compositions adapted for use in internal combustion engines it well known to those versed in this field and has resulted in substantial improvements in lubricants. These detergents are particularly useful in lubricating oil compositions which are employed in internal combustion engines used in the operation of automobiles, aircraft and similar vehicles, including diesel engines, to improve their operation by preventing or retarding corrosion, piston ring sticking, cylinder wear, and carbon and varnish formation. However, when metallic detergents are used in lubricating compositions where oil consumption is high and engine conditions are severe, such as in aircraft engines or where such concentrations of metallic detergents are used to maintain engine cleanliness under conditions where high deposit fuels of cracked or high sulfur nature are used, such as in automobile and diesel operation, the ash content from the metallic detergent accumulates in the combustion chamber and causes pre-ignition, detonation, spark plug fouling, valve burning, and ultimate destruction of the engine.

It has been found in accordance with the present invention, that if the reaction product of a phosphorus sulfide or a mixture of phosphorus and sulfur with an essentially hydrocarbon product is treated with semicarbazide or thiosemicarbazide, or with any of the substitution products or derivatives thereof as hereinafter defined, the product so formed is very stable at the temperatures of engine operation and serves the purpose of a good detergent and antioxidant. When incorporated in mineral lubricating oil which is used in an internal combustion engine, and because it contains no metal, it is free from the objectionable feature of leaving a metallic deposit or ash. These compounds are effective not only when added directly to the crankcase lubricant but also when added to the engine fuel, since in the operation of the engine it will work its way from the combustion chamber into the crankcase and there blend with the lubricant.

The mechanism whereby the phosphorus sulfide-hydrocarbon reaction products are improved by treatment with semicarbazide type compounds has not yet been completely worked out. It appears, however, that neutralization or partial neutralization by the semicarbazide type base of acidic groups present in the phosphorus sulfide treated hydrocarbon may be at least partially involved. Applicant of course does not wish to be limited by theories of mechanism.

Semicarbazide and thiosemicarbazide and their derivatives may be employed as reagents for treating the phosphorus sulfide-hydrocarbon reaction product. The free base is entirely suitable and is generally preferred. However, the final products can be formed by double decomposition of an inorganic acid salt of the base with a metal salt of the phosphorus sulfide-hydrocarbon reaction product. For example, the hydrochloride or sulfate of the base can be reacted with the sodium, calcium, barium, or other metallic salt of the phosphorus sulfide-hydrocarbon reaction product.

Broadly, the semicarbazide or thiosemicarbazide type basic compounds which may be reacted in accordance with the present invention may be defined by the formula $$\begin{array}{c} R_1 \quad\; R_3 \;\; X \quad\; R_4 \\ \phantom{R_1}\diagdown \phantom{xx} | \phantom{x} \| \phantom{xx} \diagup \\ \phantom{xxxx} N\!-\!N\!-\!C\!-\!N \\ \phantom{R_1}\diagup \phantom{xxxxxxxxx} \diagdown \\ R_2 \phantom{xxxxxxxxxx} R_5 \end{array}$$

in which $R_1$, $R_2$, $R_3$, $R_4$, and $R_5$ are each hydrogen or hydrocarbon groups containing 1 to 20 carbon atoms each, e. g., straight chain alkyl groups, such as methyl, ethyl, propyl, butyl, and higher straight and branched chain alkyl groups, such as octyl, isooctyl, 2-ethylhexyl, decyl, dodecyl, tetradecyl, cetyl and stearyl radicals, and may also represent cycloalkyl, arylalkyl, aryl or alkylaryl groups, e. g., methylcyclohexyl, phenylethyl, phenyl, cresyl, and tert.-butylphenyl groups. It will be understood that $R_1$, $R_2$, etc., may represent the same or different atoms or groups in the same molecule. X in the formula represents oxygen or sulfur.

For the purpose of listing a number of representative examples of derivatives of semicarbazide and thiosemicarbazide which are particularly useful in accordance with the present invention, the positions in the basic semicarbazide molecule may be indicated thus:

$$\begin{array}{c} \phantom{xxxxxxxx} O\,(5) \\ \phantom{xxxxxxxx} \| \\ \overset{(1)}{H_2N}\!-\!\overset{(2)}{NH}\!-\!C\!-\!NH_2 \\ \phantom{xxxxx} (3)\;\,(4) \end{array}$$

Represenative basic materials are the following:
4-methyl thiosemicarbazide
4-ethyl thiosemicarbazide
4-phenyl thiosemicarbazide
2-methyl-4-phenyl thiosemicarbazide
2-ethyl-4-phenyl thiosemicarbazide
1,2-dimethyl-4-phenyl thiosemicarbazide
1-ethyl semicarbazide
2-propyl semicarbazide
4-phenyl semicarbazide The sulfide of phosphorus which is employed in the reaction with the hydrocarbon material can be $P_2S_3$, $P_2S_5$, $P_4S_3$, $P_4S_7$, or other phosphorus sulfide, or mixtures thereof, and is preferably phosphorus pentasulfide, $P_2S_5$. Mixtures of elemental phosphorus and sulfur can be employed, in which case it is preferable to employ white phosphorus and powdered sulfur.

The essentially hydrocarbon material which may be reacted with a phosphorus sulfide in the first step of the production of additives of the present invention may be paraffins, olefins or oelfin polymers, diolefins, acetylenes, aromatics or alkyl aromatics, cyclic aliphatics, petroleum fractions, such as lubricating oil fractions, petrolatums, waxes, cracked cycle stocks, or condensation products of petroleum fractions, solvent extracts of petroleum fractions, etc., and derivatives of such hydrocarbon products containing small amounts of added elements, such as halogen or sulfur.

Essentially paraffinic hydrocarbons such as bright stock residua, lubricating oil distillates, petrolatums or paraffin waxes may be employed. Of this class of compounds, bright stocks are highly preferred. There may also be employed products obtained by condensing any of the foregoing hydrocarbons, usually through first halogenating the hydrocarbon, with aromatic hydrocarbons in the presence of anhydrous inorganic halides, such as aluminum chloride, zinc chloride, boron fluoride, and the like.

As examples of monoolefins may be mentioned isobutylene, acrolein, decene, dodecene, cetene ($C_{16}$), octadecene ($C_{18}$), cerotene ($C_{26}$), melene ($C_{30}$), olefinic extracts from gasoline or gasoline itself, cracked cycle stocks and polymers thereof, resin oils from crude oil, hydrocarbon coal resins, cracked waxes, dehydrohalogenated chlorinated waxes, and any mixed high molecular weight alkenes obtained by cracking petroleum oils. A preferred class of olefins are those having at least 20 carbon atoms per molecule, of which from about 12 to about 18 carbon atoms, and preferably at least 15 carbon atoms, are in a long chain. Such olefins may be obtained by the dehydrogenation of paraffin waxes, by the dehydrohalogenation of long chain alkyl halides, by the synthesis of hydrocarbons from CO and $H_2$, by the dehydration of alcohols, etc.

Another class of suitable olefinic materials are the monoolefin polymers, in which the molecular weight ranges from 100 to 50,000, preferably from about 250 to about 10,000. These polymers may be obtained by the polymerization of low molecular weight monoolefinic hydrocarbons, such as ethylene, propylene, butylene, isobutylene, normal and isoamylenes, or hexenes, or by the copolymerization of any combination of the above monoolefinic materials.

Diolefins which may be employed include well known materials such as butadiene, isoprene, chloroprene, cyclopentadiene, 2,3-dimethylbutadiene, pentadiene-1,3-hexadiene-2,4, terpenes and the like. Acetylene and substituted acetylenes may similarly be employed.

Another class of unsaturated hydrocarbon materials which may be advantageously employed in the preparation of the additives of this invention are high molecular weight copolymers of low molecular weight monoolefins and diolefins. The copolymer is prepared by controlled copolymerization of a low molecular weight olefin and a non-aromatic hydrocarbon showing the general formula $C_nH_{2n-x}$, in which $x$ is 2 or a multiple of 2, in the presence of a catalyst of the Friedel-Crafts or peroxide type. The low molecular weight olefin is preferably an isoolefin or a tertiary base olefin preferably one having less than 7 carbon atoms per molecule. Examples of such olefins are isobutylene, 2-methylbutene-1, 2-ethylbutene-1, secondary and tertiary base amylene, hexylenes, and the like. Examples of the non-aromatic hydrocarbons of the above formula which can be used are the conjugated diolefins listed in the preceding paragraph, diolefins such as 1,4-hexadiene, in which the double bond is not conjugated, as well as the acetylenes. The copolymerization is preferably carried out in the presence of aluminum chloride, boron fluoride, or benzoyl peroxide, and the copolymer is preferably one having a molecular weight of about 1,000 to 30,000.

Another class of essentially hydrocarbon materials which may likewise be employed in the preparation of the additives of this invention are sulfurized hydrocarbons, which may be prepared by reacting any of the unsaturated hydrocarbons described above with elemental sulfur, or by reacting such hydrocarbons with a sulfur halide, followed, if desired, by a dehydrohalogenation step, which may, for example, be accomplished by treating the sulfurized and halogenated hydrocarbon product with phenol or other aromatic hydrocarbon, according to the method described in the Winning and Rogers U. S. Patent No. 2,422,275, or by heating the sulfurized and halogenated hydrocarbon in the presence of a secondary or tertiary saturated monohydric aliphatic alcohol of 4 to 16 carbon atoms at a temperature of 100–320° F.

Another class of hydrocarbons which may be employed in a similar manner are aromatic hydrocarbons, such as benzene, naphthalene, anthracene, toluene, xylene, diphenyl, and the like, as well as aromatic hydrocarbons having alkyl substituents and aliphatic hydrocarbons having aryl substituents.

A still further class of hydrocarbons which may be employed in the reaction with sulfides of phosphorus are condensation products of halogenated aliphatic hydrocarbons with an aromatic compound, produced by condensation in the presence of aluminum chloride or other Friedel-Crafts type catalyst. The halogenated aliphatic hydrocarbon is preferably a halogenated long chain paraffin hydrocarbon having more than 8 carbon atoms, such as paraffin wax, petrolatum, ozocerite wax, etc. High viscosity paraffin oils, particularly heavy residual oil which has been treated with chemicals or extracted with propane or other solvents for the removal of asphalts, may be employed. The aromatic constituent may be naphthalene, fluorene, phenanthrene, anthracene, coal tar residues, and the like.

Another type of hydrocarbon material which may be similarly employed is a resin-like oil which has a molecular weight of from about 1,000 to 2,000 or higher, obtained preferably from a praffinic oil which has been dewaxed and which is then treated with a liquified normally gaseous hydrocarbon, e. g., propane, to precipitate a heavy propane-insoluble fraction. The latter is a substantially wax-free and asphalt-free product having a Saybolt viscosity at 210° F. of about 1,000 to about 4,000 seconds or more.

The phosphorus sufide-hydrocarbon reaction product may be readily obtained by reacting the phosphorus sulfide or mixture of elemental phosphorus and sulfur with one or more of the herein described hydrocarbons at a temperature of about 200° F. to about 600° F., and preferably from about 300° F. to about 550° F., using in the reaction mixture preferably from about one to about three molecular proportions of hydrocarbon to one atomic proportion of phosphorus and at least one-third atomic proportion of sulfur in the sulfide of phosphorus or mixture of phosphorus and sulfur. It is advantageous to maintain a non-oxidizing atmosphere, such as an atmosphere of nitrogen, above the reaction mixture. Usually it is desirable to use an amount of the phosphorus sulfide that will completely react with the hydrocarbon so that no further purification becomes necessary. In the case of the reaction of monoolefin polymers with $P_2S_5$ the preferred ratio is one molecular proportion of the sulfide of phosphorus to two to five molecular proportions of polymer. In such case the reaction is continued until all or substantially all of the phosphorus sulfide has reacted. The reaction time is not critical, and the time required to cause the maximum amount of phosphorus sulfide to react will vary greatly with the temperature. A reaction time of 2 to 10 hours is frequently necessary. If desired, the reaction product may be further treated by blowing with steam, alcohol, ammonia, or an amine at an elevated temperature of about 200° F. to about 600° F. to improve the odor thereof.

The additives of the present invention may then be prepared by reacting the above phosphorus sulfide-hydrocarbon reaction product with the organic basic compound of the type described herein, i. e., semicarbazide, thiosemicarbazide, or salts or derivatives of the same. This reaction may be carried out, preferably in a non-oxidizing atmosphere, by contacting the phosphorus sulfide-hydrocarbon reaction product, either as such or dissolved in a suitable solvent such as naphtha, with the semicarbazide compound at a temperature of 35–500° F., more preferably at a temperature of 200–350° F. It has been found that somewhat superior products are formed when a water-soluble basic compound, e. g., thiosemicarbazide, is dissolved in or mixed with water when contacted with the phosphorus sulfide-hydrocarbon reaction product. It is preferable to employ about one-half to one mol of semicarbazide compound for each mol of hydrocarbon originally reacted with the phosphorus sulfide or mixture of phosphorus and sulfur.

Since the additives of the present invention are to be dissolved in mineral oils, the hydrocarbons which are reacted with a sulfide or phosphorus and the semicarbazide compounds will be chosen with a view to provide a product which is soluble in the oil base or which has such marginal solubility that it can be plasticized with a high molecular weight alcohol, ester, or other plasticizer.

When additives of the present invention are employed in mineral lubricating oils, they are preferably added in proportions of about 0.001 to about 10.0% and preferably 1.0 to about 6.0%. The proportions giving the best results will vary somewhat according to the nature of the additive and the specific purpose which the lubricant is to serve in a given case. For commercial purposes, it is convenient to prepare concentrated oil solutions in which the amount of additive in the composition ranges from 25% to 50% by weight, and to transport and store them in such form. In preparing a lubricating oil composition for use as a crankcase lubricant the additive concentrate is merely blended with the base oil in the required amount.

In certain cases it may be found that the effect of adding compounds of the type described above to a lubricating oil will be to increase the detergent effect of the oil without sufficiently providing oxidation resisting characteristics. In such a case it is advantageous to add to the lubricant, in addition to the additives of the present invention, a substance containing sulfur and/or phosphorus. Elemental sulfur may be used for this purpose or an organic sulfur compound, particularly an organic sulfur compound capable of being decomposed to give free sulfur at a temperature to which the lubricant is subjected during use. Examples of such organic sulfur compounds are sulfurized mineral oils, terpenes, olefins, and diolefins, sulfurized animal and vegetable oils, sulfurized isobutylene polymer, etc.

Below are given detailed descriptions of preparations of two examples of lubricating oil additives of the type described above as well as engine tests in which oils containing the additives were employed as the lubricant. It is to be understood that the examples are given as illustrations of the present invention and are not to be construed as limiting the scope thereof in any way.

*Example 1*

(a) 1200 grams of polyisobutylene of a molecular weight of about 1200 was placed in a 3-liter, 3-necked round bottom flask and heated to 300° F. 125 grams of phosphorus pentasulfide was added and the temperature raised to 400° F. over a two-hour period, and heating was continued at this temperature for 3 more hours with stirring. The mixture was blown with nitrogen for another 5 hours at 400° F. and then filtered. 200 grams of the phosphorus pentasulfide-treated polyisobutylene thus prepared was dissolved in 200 grams of a solvent extracted Mid-Continent distillate oil at 150 seconds (Saybolt) at 100° F., thus forming an approximately 50% oil concentrate of the phosphorus pentasulfide-polyisobutylene reaction product.

(b) A slurry of about 5% by weight of free semicarbazide, based on the active ingredient of the product of (a), was prepared by adding 18.0 grams of semicarbazide hydrochloride to a solution of 9.1 grams of potassium hydroxide in 15 ml. of distilled water, and adding this mixture to 250 grams of the phosphorus pentasulfide-treated polyisobutylene of (a) at 150° F. The temperature was then raised over a 3½ hour period to 310° F., the reaction being conducted with vigorous stirring and a steady stream of nitrogen was bubbled through the mixture during the entire heating period. The product was filtered to provide the finished additive.

*Example 2*

A 200 gram portion of a 50% concentrate of phosphorus pentasulfide-polyisobutylene reaction product, prepared as in Example 1 (a), was treated with 5 grams of powdered thiosemicarbazide at 300° F. for 3 hours and filtered to obtain the final additive.

*Example 3.—Lauson engine tests*

The additives prepared by the methods of Examples 1 and 2 were each blended in a lubricating oil base consisting of a solvent extracted coastal naphthenic oil of 60 seconds (Saybolt) viscosity at 210° F. The blends contained 4% by weight of the concentrates or 2% by weight of active ingredients. The blends were submitted to a standard Lauson engine test which was conducted by operating the Lauson engine at 1800 R. P. M. for 20 hours with a 1.5 indicated kilowatt load, 300° F. oil temperature, and 295° F. jacket temperature, using in each test one of the prepared blends as the crankcase lubricant. A similar test was applied to the unblended base oil. The oils were rated by a demerit system, wherein a perfectly clean surface is given a rating of 0, while a rating of 10 is given to the worst condition which could be expected by the deposition of varnish on that surface. Observations were also made of the loss in weight of the copper-lead bearing in each test. The results are shown in the following table:

| Lubricant | Piston Varnish Demerit | Cu-Pb Bearing Weight Loss (gm./Bearing) |
| --- | --- | --- |
| Base oil | 4.0 | 0.11 |
| Base oil+product of Example 1 | 0.75 | 0.063 |
| Base oil+product of Example 2 | 0.75 | 0.04 |

These results show the excellent detergency characteristics and significant corrosion resisting properties of the new additives.

*Example 4.—Laboratory bearing corrosion test*

Blends were prepared containing 0.25% by weight each of the active ingredients of the additives prepared as described in Examples 1 and 2, using as a base oil a solvent extracted Mid-Continent paraffinic lubricating oil of SAE 20 grade. Samples of these blends and a sample of the unblended base oil were submitted to a laboratory test designed to measure the effectiveness of the additive in inhibiting the corrosiveness of a typical mineral lubricating oil towards the surfaces of copper-lead bearings. The test was conducted as follows:

500 cc. of the oil was placed in a glass oxidation tube (13 inches long and 2⅝ inches in diameter) fitted at the bottom with a ¼ inch air inlet tube perforated to facilitate air distribution. The oxidation tube was then immersed in a heating bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each four-hour period the bearings were removed, washed with naphtha and weighed to determine the amount of loss by corrosion. The bearings were then repolished (to increase the severity of the test), reweighed, and then subjected to the test for additional four-hour periods in like manner. The results are given in the following table as "corrosion life," which indicates the number of hours required for the bearings to lose 100 mg. in weight, determined by interpolation of the data obtained in the various periods.

| Oil | Bearing Corrosion Life (Hrs.) |
| --- | --- |
| Unblended base oil | 10 |
| Base oil+additive of Example 1 | 28 |
| Base oil+additive of Example 2 | 32 |

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, thiophosphates, phosphites and thiophosphites, metal salicylates, metal xanthates and thioxanthates, metal thiocarbamates, amines and amine derivatives, reaction products of metal phenates and sulfur, reaction products of metal phenates and phosphorus sulfides, metal phenol sulfonates, and the like. Thus the additives of the present invention may be used in lubricating oils containing such other addition agents as barium tert.-octylphenol sulfide, calcium tert.-amylphenol sulfide, nickel oleate, barium octadecylate, calcium phenyl stearate, zinc diisopropyl salicylate, aluminum naphthenate, calcium cetyl phosphate, barium di-tert.-amylphenol sulfide, calcium petroleum sulfonate, zinc methyl cyclohexyl thiophosphate, calcium dichlorostearate, etc. Other types of additives such as phenols and phenol sulfides may be employed.

The lubricating oil base stocks used in the compositions of this invention may be straight mineral lubricating oils or distillates derived from paraffinic, naphthenic, asphaltic, or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc. Hydrogenated oils, white oils, or shale oil may be employed as well as synthetic oils, such as esters and polyethers as well as those prepared, for example, by the polymerization of olefins or by the reaction of oxides of carbon with hydrogen or by the hydrogenation of coal or its products. Also, for special applications, animal, vegetable or fish oils or their hydrogenated or voltolized products may be employed in admixture with mineral oils.

For the best results the base stock chosen should normally be that oil which without the new additive present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds (Saybolt) viscosity at 210° F. For the lubrication of certain low and medium speed diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel engine and other gasoline engine service, oils of higher viscosity index are often preferred, for example, up to 75 to 100, or even higher, viscosity index.

In addition to the material to be added according to the present invention, other agents may also be used such as dyes, pour depressors, heat thickened fatty oils, sulfurized fatty oils, organo-metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds, and the like may also be employed.

Assisting agents which are particularly desirable as plasticizers and defoamers are the higher alcohols having 8 or more carbon atoms and preferably 8 to 20 carbon atoms, e. g., lauryl alcohol, stearyl alcohol, wax oxidation alcohols, and the like.

In addition to being employed in lubricants the additives of the present invention may also be used in motor fuels, hydraulic fluids, torque converter fluids, cutting oils, flushing oils, turbine oils or transformer oils, industrial oils, process oils and generally as antioxidants or detergents in mineral oil products. They may also be used in gear lubricants and greases. Since they are powerful surface active agents, they have practical use in dry cleaning fluids, mineral spirit and aqueous paints, in flotation agents, and as dispersants for insecticides in aqueous and non-aqueous solutions and for carbon black in rubber mixes.

What is claimed is:

1. As a new composition of matter a product obtained by preparing a first reaction product chosen from the group consisting of (a) the products obtained by reacting the sulfides of phosphorus with an essentially hydrocarbon material (b) the products obtained by reacting a mixture of the elements of phosphorus and sulfur with an essentially hydrocarbon material and (c) the metal salts of (a) and (b), and then by reacting the said first reaction product with an organic compound selected from the groups consisting of (d) compound of the composition,

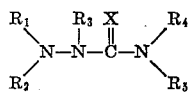

wherein $R_1$, $R_2$, $R_3$, $R_4$, and $R_5$ are each selected from the groups consisting of hydrogen and hydrocarbon radicals containing 1 to 20 carbon atoms each, and X is selected from the group consisting of oxygen and sulfur and (e) an inorganic acid salt of (d) provided that reaction products (a) and (b) are reacted only with compound (d) and reaction product (c) is reacted only with inorganic acid salt (e).

2. A composition according to claim 1 in which $R_1$, $R_2$, $R_3$, $R_4$ and $R_5$ of the formula each represent hydrogen.

3. A composition according to claim 1 in which X of the formula represents sulfur.

4. A composition according to claim 1 in which the hydrocarbon material is a paraffinic lubricating oil bright stock fraction.

5. A composition according to claim 1 in which the sulfide of phosphorous is phosphorus pentasulfide, in which the hydrocarbon material is a monoolefin, and in which the reaction product is reacted with thiosemicarbazide.

6. A composition according to claim 5 in which the monoolefin is polyisobutylene.

7. As a new composition of matter a product obtained by reacting about one molecular proportion of phosphorus pentasulfide with 2 to 5 molecular proportions of polyisobutylene at a temperature of about 300° to about 550° F., and then treating the product thus obtained with semicarbazide.

8. As a new composition of matter a product obtained by reacting about one molecular proportion of phosphorus pentasulfide with 2 to 5 molecular proportions of polyisobutylene at a temperature of about 300° to about 550° F., and then treating the product thus obtained with thiosemicarbazide.

9. The process which comprises preparing a first reaction product chosen from the group consisting of (a) the products obtained by reacting the sulfides of phosphorus with an essentially hydrocarbon material (b) the products obtained by reacting a mixture of the elements of phosphorus and sulfur with an essentially hydrocarbon material and (c) the metal salts of (a) and (b), then reacting said first reaction product with an organic compound selected from the group consisting of (d) a compound of the composition

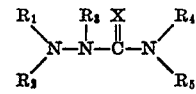

wherein $R_1$, $R_2$, $R_3$, $R_4$, and $R_5$ are each selected from the groups consisting of hydrogen and hydrocarbon radicals containing 1 to 20 carbon atoms each, and X is selected from the group consisting of oxygen and sulfur and (e) an inorganic acid salt of (d) provided that reaction products (a) and (b) are reacted only with compound (d) and reaction product (c) is reacted only with inorganic acid salt (e).

10. The process according to claim 9 in which the sulfide of phosphorous is phosphorus pentasulfide and in which the hydrocarbon is a monoolefin.

11. The process which comprises reacting about one molecular proportion of a phosphorus sulfide with 2 to 5 molecular proportions of polyisobutylene at a temperature of about 300° to about 550° F., and then reacting the product thus obtained with semicarbazide.

12. The process which comprises reacting about one molecular proportion of a phosphorus sulfide with 2 to 5 molecular proportions of polyisobutylene at a temperature of about 300° to about 550° F., and then reacting the product thus obtained with thiosemicarbazide.

ROBERT H. JONES.

References Cited in the file of this patent

UNITED STATES PATENTS

| Number | Name | Date |
|---|---|---|
| 2,316,088 | Loane | Apr. 6, 1943 |
| 2,322,184 | White | June 15, 1943 |
| 2,386,222 | Lincoln | Oct. 9, 1945 |
| 2,421,352 | Paul | May 27, 1947 |
| 2,431,652 | Trueger | Nov. 25, 1947 |